Patented Oct. 10, 1950

2,525,071

UNITED STATES PATENT OFFICE 2,525,071

LAMINATED SHEET MATERIAL AND COMPOSITIONS

Paul E. Hardy, Elizabeth, and William J. Sparks, Westfield, N. J., assignors to Standard Oil Development Company, a corporation of Delaware No Drawing. Application November 30, 1945, Serial No. 632,103

9 Claims. (Cl. 154—50)

This invention relates to the preparation of improved compositions suitable for making substantially transparent sheet materials and molded products, and more particularly it relates to the preparation of such compositions by compounding substantial amounts of certain mineral fillers with a certain class of hydrocarbon copolymer plastics. The invention may be typified by a composition comprising one part by weight of a bentonite clay and one to two parts by weight of a styrene-isobutylene copolymer having an intrinsic viscosity of about 0.7 to 1.0 and having a combined styrene content of about 60%. This product can be sheeted out into thin films and sheets which are substantially transparent, in spite of the presence of the extremely large proportion of mineral filler which normally per se is a substantially opaque material.

U. S. Patent 2,274,749 describes copolymers of the general type referred to above, such as copolymers of isobutylene and styrene, and methods of preparing same, such as copolymerizing said reactants at a temperature below about 0° C. in the presence of an active halide polymerization catalyst, preferably in the presence of an inert volatile organic liquid serving as solvent and refrigerant. The temperature may vary considerably; for instance, it may be −10° C., −50° C., −78° C., −103° C. or even lower. By adjusting the proportions of the two raw materials, copolymers of desired hardness, melting point, plasticity, etc. may be obtained.

Instead of isobutylene other aliphatic olefins may be used, preferably having more than 2 carbon atoms and preferably iso-olefins having 4 to 8 carbon atoms, such as isopentene (2 methyl 1 butene) or a pentene obtained by dehydration of iso amyl alcohol.

Instead of styrene other materials may be used such as indene, terpenes, alpha methyl styrene, para methyl styrene, alpha methyl para methyl styrene, etc.

The copolymerization is effected by mixing the two reactants, with or without a mutual solvent, such as propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex-$(AlCl_3.Al(OC_2H_5)_3)$ and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane, at or below the boiling point of the catalyst solvent, and then the catalyst solution cooled down, filtered and added to the reaction mixture. Alternative catalysts include: $AlCl_3.AlCl_2OH$, $AlBr_3.AlBr_2OH$, $AlBr_2Cl.AlOCl$, $AlBrCl_2.AlOBr$, $TiCl_4.AlCl_2OH$, $TiOCl_2.TiCl_4$, $AlBr_3.Br_2.CS_2$, $BF_3$.-isopropyl alcohol, $BF_3$ solution in ethylene, activated $BF_3$ catalyst in ethylene solution, activated $BF_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization. After completion of the copolymerization, residual catalyst is killed with alcohol, for example, isopropyl and excess catalyst removed by washing the product with water and preferably also with dilute aqueous hydrochloric acid. The resulting solid copolymer may range from a relatively stiff plastic mass to a hard tough thermoplastic solid, depending upon the temperature of polymerization, the yield of polymer obtained upon the active feed, the type and concentration of catalyst, the proportion of cyclic reactant in the feed, and the temperature at which the physical texture is observed. The proportions in which the reactants, e. g., styrene and isobutylene, have actually combined during copolymerization may be determined by interpolation of a carbon-hydrogen analysis between the limits for instance:

| | Carbon | Hydrogen |
|---|---|---|
| | Per cent | Per cent |
| Pure styrene | 92.3 | 7.7 |
| Pure isobutylene | 85.7 | 14.3 |

Generally the molecular weight of the product will range from about 800 upwards, for instance, to 3,000, 5,000, 25,000 or much higher, the higher molecular weights, higher intrinsic viscosity (greater than 0.5 or preferably greater than .6) and greater plasticity of polymer product at room temperature being obtained at lower polymerization temperatures, e. g. −75° C. to −103° C. and with lower content of cyclic reactant, e. g. 10%–50%; on the other hand, with relatively higher polymerization temperatures such as −40° C. or −20° C., and with higher proportion of cyclic material, e. g. 50–60% or more, the resulting copolymers are lower in molecular weight and intrinsic viscosity, and have a harder texture.

For convenience and brevity the above-described copolymer of a cyclic polymerizable material and an olefin or alkene will be referred to as a cyc-alkene copolymer, or more simply a cyc-alkene. The specific type of copolymer made from styrene and isobutylene will similarly be referred to as simply stybutene. The invention will be illustrated as applied particularly to stybutene, although it is not to be limited specifically thereto.

Many resinous and plastic materials either occurring in nature or made synthetically heretofore are unsuitable for sheeting out into thin self-supporting films because they are either too brittle or have too much cold flow, etc.

For the preparation of transparent self-supporting films and other products formed of stybutene according to the present invention, it is preferred to use a stybutene made in methyl chloride solution (1.5 to 3.5 volumes methyl chloride per volume of active feed) at a temperature between the approximate limits of −65° C. and −103° C., using about 35% to 75%, preferably about 40% to 60%, of styrene in the styrene-isobutylene copolymer. Even with these preferred conditions, however, it is difficult to make clear, transparent films by the ordinary method of sheeting the stybutene plastic on standard rubber manufacturers' rolls.

Broadly, the present invention comprises compounding with a styrene-isobutylene copolymer or other cyc-alkene copolymer, having an intrinsic viscosity of at least 0.6 and having about 35 to 75% content of combined styrene or other polymerizable cyclic constituents, a substantial amount of a finely comminuted inorganic filler having a refractive index of 1.540 to 1.570 and within about 0.02, and preferably within about 0.01, of the refractive index of said copolymer and having a fineness of at least 95% through a 100 mesh screen, preferably at least 95% through 325 mesh.

The refractive index of polybutene is about 1.51 and that of polystyrene is about 1.59. Accordingly a styrene-isobutylene copolymer having a combined styrene content of about 60% and having an intrinsic viscosity of about 0.7, has a refractive index of about 1.56. Two mineral clay type fillers which have been found particularly successful in conjunction with this particular stybutene copolymer are bentonite and finely ground muscovite type of mica. The bentonite is a sodium montmorillonite and is derived from a clay from the Pacific Coast states. It consists mainly of silica with a minor amount alumina and small amounts of other oxides. The mica employed herein had a typical chemical analysis showing : 56.38% $SiO_2$, 27.63% $Al_2O_3$, 5.91% $K_2O$, 2.76% $Na_2O$, 1.08% CaO, 3.82% loss on ignition, and traces of other minor constituents. Mica is a potassium aluminum silicate which is found primarily in India, Canada and Sweden.

The refractive index of these two types of mineral fillers was found to be between 1.558 and 1.566, as determined by the method described in E. E. Wahlstrom's book "Optical Crystallography" 1943, page 40. This method consists in determining whether a particle of the solid being tested has a refractive index greater or less than various liquids in which it is dispersed. This is done by observing in a microscope whether the Becke line (the fringe of light around the particle caused by the refraction of light by the edges of the particle) moves in toward the particle or out toward the liquid when the microscope tube is raised slightly above the position of clear focus. By changing immersion liquids, or by using two liquids mixed in a series of different compositions, it is possible to establish rather narrow limits between which the value for the index of refraction of the particle being tested lies. For making the observations referred to above, a series of tests were made all in the temperature range of 24 to 26° C., using toluene and bromoform alone and in several mixtures as indicated in the following table:

| Test Liquid No. | Composition, volume per cent | | Refractive Index |
| --- | --- | --- | --- |
| | Toluene | Bromoform | |
| a | 100 | | 1.495 |
| b | 50 | 50 | 1.545 |
| c | 33.3 | 67.7 | 1.558 |
| d | 25 | 75 | 1.566 |
| e | | 100 | 1.595 |

The bentonite and mica were found to have a refractive index between those of liquids c and d namely between 1.558 and 1.566. Numerous other clays and silicious fillers were found to have refractive indices which were substantially less than 1.558 or substantially greater than 1.566, and none of these other materials were satisfactory in making a substantially transparent film when compounded in a concentration of 50% by weight into a stybutene of 60% of styrene content as described above, and sheeted into a thin film. Some of the materials tested gave very poor results; for instance a titanium oxide powder and a diatomaceous earth both made opaque sheets. Several other materials such as a whiting, and several different types of clays, i. e., hydrated aluminum silicates, had fair translucency, but not sufficient to be classed as substantial transparency. Several other pulverulent mineral fillers, particularly various types of calcium carbonates and calcium silicates were entirely unsuitable in 50% concentration for molding into sheets with the stybutene copolymer because they made mixtures which stuck so badly to the mold plates that they could be removed only by chipping and scraping.

Thus, for the purpose of the present invention, the filler to be compounded with a stybutene of 55 to 65%, and especially of 60% combined styrene content, should have a refractive index in the range of about 1.558 to 1.566 and should be "wetted" by the stybutene copolymer during compounding.

For stybutene copolymers having a slightly lower combined styrene content, e. g., about 45 to 55%, inorganic fil'ers having a refractive index within the range of about 1.545 to about 1.555 are preferred. Examples of such fillers include certain paolinite clays. In carrying out the present invention, the stybutene or other cyc-alkene copolymer, which should have an intrinsic viscosity of about 0.6 to 3.0 which, as explained above, depends upon the temperature of copolymerization and the proportion of styrene or other polymerizable cyclic constituents in the feed, should be heated well above the softening point, for instance, to a temperature of about 100°–180° C., preferably in a heated kneader-type mixer for 15 minutes or so during which the powdered filler such as sodium montmorillonite or ground mica, is gradually added, and then when the mixture is completely homogeneous, it is discharged from the kneader and given a quick single pass through a pair of ordinary smooth steel rolls maintained at a temperature of about 50° to 100° C. to form the copolymer into a sheet which may then immediately be passed through molecule-orienting rolls which are preferably maintained at a temperature of about 60° to as low as 20° C. or so, the speed of passing through these special rolls being maintained at about 1 to 18 feet per minute to obtain a thin, flexible, clear, transparent and yet moisture-proof and gas-proof sheet or film which may be used as a wrapping material or as an adhesive or bonding agent for making laminated sheet material on paper, cloth, wood, etc. or for other purposes. If it is not desired to use the special molecule-orienting roll, the hot kneaded mass of homogeneous copolymer-filler mixture may be given a single pass through a cold mill, i. e., a pair of cold steel rolls at a temperature of about 50° to about 30° C. or lower.

Instead of rolling a hot mixture into sheets or film per se, the hot mixture may be calendered directly onto other sheet material such as paper, cloth, wood, etc. which may or may not be colored or have some design or mottling which it is desired to have show through the transparent protective hydrocarbon film. The hot mixture may also be pressed into sheets or molded into other forms, or may be extruded into any desired form.

The amount of powdered filler to be compounded with the stybutene or other copolymer according to this invention, may range from relatively small amounts such as 1 to 5% to very large proportions such as 50% or more, depending primarily upon the purposes to be accomplished. The larger the amount of powdered filler used, the greater is the reduction in combustibility of the film or sheet or other molded product made and thus 20 to 60% by weight of filler is preferred for this particular purpose. Also, relatively large amounts of filler, e. g., more than about 60% by weight of filler, cause an appreciable increase in the stiffness or rigidity of the sheeted or other molded products formed. Such relatively large amounts of filler also effect a substantial saving in the cost of the products. On the other hand, the relatively small amounts of the powdered filler having a certain amount of value as a workability aid, and permit the use of slightly higher temperatures in sheeting the film.

If desired, small amounts of other materials may be added to the copolymer plastic before or after mixing the powdered filler with it, as for instance, small amounts of soluble coloring agent, e. g., blue, red, yellow, green, or other colored dyes, which are preferably of the oil soluble type, so that the resultant film will be a colored transparent film. Colorless or colored light-absorbed substances may also be added such as quinine, aesculin, etc. to protect materials or articles wrapped in such a film from the harmful effect of sunlight, ultra-violet light, etc.

It is not intended that this invention be limited to the specific materials or conditions which have been recited merely for the sake of illustration, but only by the appended claims in which it is intended to claim all novelty inherent in the invention as well as all modifications coming within the scope and spirit of the invention.

We claim:

1. A substantially transparent composition comprising a styrene-isobutylene copolymer having an intrinsic viscosity greater than 0.5 and having a combined styrene content of 35 to 75% by weight and a proportionate refractive index of 1.540 to 1.570, and said composition also comprising homogeneously admixed therewith 1 to 60% by weight of a normally opaque-appearing mineral aluminum silicate filler having a refractive index between the approximate limits of 1.540 and 1.570, and having a refractive index within .02 of that of said copolymer, said filler having a fineness of at least 95% through a 100 mesh screen.

2. A substantially transparent composition comprising a styrene-isobutylene copolymer having an intrinsic viscosity greater than 0.5 and having a combined styrene content of 55 to 65% by weight, and a proportionate refractive index of 1.555 to 1.570 having homogeneously admixed therewith 20 to 60% by weight of a powdered normally opaque-appearing mineral aluminum silicate filler selected from the group consisting of kaolinite, bentonite clay, and muscovite mica, having a refractive index of 1.555 to 1.570 and having a refractive index within .01 of that of said copolymer, said filler having a fineness of at least 95% through a 100 mesh screen.

3. Composition according to claim 2 in which the copolymer has the combined styrene content of 60%, and the silicate filler has a refractive index of 1.558 to 1.566.

4. Composition according to claim 2 in which the filler is a sodium montmorillonite.

5. Composition according to claim 2 in which the filler is a ground mica.

6. A substantially clear transparent waterproof and moisture-proof self-supporting film comprising a major proportion of a styrene-isobutylene copolymer having an intrinsic viscosity greater than 0.5 and having a combined styrene content of 45 to 65% by weight, having homogeneously admixed therewith 1 to 60% by weight of a powdered mineral aluminum silicate filler selected from the group consisting of kaolinite and bentonite clays and muscovite mica having a refractive index between the limits of 1.545 to 1.570 and having a refractive index within .02 of that of said copolymer, and said filler having a fineness of at least 95% through a 100 mesh screen.

7. A substantially clear transparent moisture-proof self-supporting film consisting essentially of 50% by weight of a styrene-isobutylene copolymer having an intrinsic viscosity greater than 0.5 and a combined styrene content of 60%, having homogeneously admixed therewith 50% by weight of a sodium montmorillonite having a refractive index between 1.558 and 1.566 and having a fineness of at least 95% through a 100-mesh screen.

8. A substantially transparent composition comprising a styrene-isobutylene copolymer having an intrinsic viscosity of about 0.7 and having a combined styrene content of 60% by weight, and a refractive index of 1.56, said composition also comprising homogeneously admixed therein 50% by weight of powdered normally opaque-appearing sodium montmorillonite having a refractive index of 1.558 to 1.566, and having a fineness of at least 95% through a 325 mesh screen.

9. A laminated sheet material including paper having calendered thereon a substantially transparent, moisture-proof, flexible, combustion-resistant surface film comprising a styrene-isobutylene copolymer having an intrinsic viscosity greater than 0.6 and a combined styrene content of 45 to 65 weight per cent, having homogeneously admixed therewith 20 to 60% by weight of powdered sodium montmorillonite having a fineness of at least 95% through a 100 mesh screen.

PAUL E. HARDY.
WILLIAM J. SPARKS.

REFERENCES CITED

The following references are of record in the file of this patent:

UNITED STATES PATENTS

| Number | Name | Date |
| --- | --- | --- |
| 157,934 | Sawyer | Dec. 22, 1874 |
| 1,027,727 | Harbeck | May 28, 1912 |
| 2,222,956 | Seaton | Nov. 26, 1940 |
| 2,274,749 | Smyers | Mar. 3, 1942 |
| 2,311,613 | Slayter | Feb. 16, 1943 |

OTHER REFERENCES

Handbook of Plastics by Simonds and Ellis, published 1943, pages 201, 205 and 271. (Copy in Div. 67.)

Handbook of Chemistry and Physics 1944, pp. 1204–1205.

"Non Metallic Minerals" by Ladoo, McGraw-Hill Book Co. 1925, p. 138. (Copy in Div. 63.)